US011887552B1

(12) United States Patent
Wen et al.

(10) Patent No.: US 11,887,552 B1
(45) Date of Patent: Jan. 30, 2024

(54) DISPLAY DRIVING DEVICE AND DISPLAY CONTROL DEVICE AND OPERATION METHOD THEREOF

(71) Applicant: Novatek Microelectronics Corp., Hsinchu (TW)

(72) Inventors: Fu-Jung Wen, Taoyuan (TW); Heng-Yao Lin, Hsinchu County (TW); Yen-Tao Liao, Hsinchu (TW); Jen-Ta Yang, Hsinchu County (TW); Yu-Hung Su, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 17/883,634

(22) Filed: Aug. 9, 2022

(51) Int. Cl.
*G09G 3/36* (2006.01)

(52) U.S. Cl.
CPC ..... *G09G 3/3607* (2013.01); *G09G 2310/061* (2013.01); *G09G 2320/0242* (2013.01); *G09G 2320/0247* (2013.01); *G09G 2340/0435* (2013.01)

(58) Field of Classification Search
CPC ........... G09G 3/3607; G09G 2310/061; G09G 2320/0242; G09G 2320/0247; G09G 2340/0435
See application file for complete search history.

(56) References Cited

U.S. PATENT DOCUMENTS

| | | | | |
|---|---|---|---|---|
| 2008/0186413 | A1 | 8/2008 | Someya et al. | |
| 2010/0011355 | A1* | 1/2010 | Carrigan | G06F 3/1462 718/1 |
| 2019/0180695 | A1* | 6/2019 | Ha | G09G 3/3688 |
| 2019/0206356 | A1 | 7/2019 | Kim et al. | |
| 2021/0149540 | A1* | 5/2021 | Shikata | G09G 3/20 |
| 2021/0272531 | A1 | 9/2021 | Shin et al. | |
| 2022/0101794 | A1* | 3/2022 | Kim | G09G 3/3266 |
| 2022/0215798 | A1 | 7/2022 | Pyun et al. | |

* cited by examiner

*Primary Examiner* — David Tung
(74) *Attorney, Agent, or Firm* — JCIPRNET

(57) ABSTRACT

The disclosure provides a display driving device and a display control device and an operation method thereof. The display control device includes a data analyzing circuit and a data compensation circuit. The data analyzing circuit performs arithmetic operation on multiple sub-pixel data output by a target driving channel of a source driver in a current frame to obtain a resultant value corresponding to the target driving channel. The data compensation circuit determines at least one compensation grayscale value corresponding to the resultant value. The compensation grayscale value is to be displayed by the target driving channel in a vertical blank period of a frame period in which the current frame is displayed. The target driving channel of the source driver outputs at least one compensation voltage corresponding to the at least one compensation grayscale value in the vertical blank period of the frame period.

16 Claims, 4 Drawing Sheets

DISPLAY DRIVING DEVICE AND DISPLAY CONTROL DEVICE AND OPERATION METHOD THEREOF

BACKGROUND

Technical Field

The disclosure relates to an electronic device, and more particularly, to a display driving device and a display control device and an operation method thereof.

Description of Related Art

Display panels such as liquid crystal display (LCD) panels have been widely used in current display devices. Inevitably, there is a leakage phenomenon in each pixel circuit of the display panel. The smaller the frame rate, the greater the leakage power of the pixel circuit. In the case where the time lengths of each frame are the same, that is, when the frame rate is fixed, for a certain same pixel circuit, its leakage power in different frame periods is approximately the same, so the leakage phenomenon of the pixel circuit is not significant enough to cause flicker or color cast (or a slight flicker or color cast caused by the leakage phenomenon may be tolerable).

When the display panel operates in a variable refresh rate (VRR) mode, the time lengths of each frame may vary from each other. In the case where the time lengths of each frame are different from each other, that is, when the frame rate changes dynamically, because the leakage power of the same pixel circuit in different frame periods is different from each other, the leakage phenomenon causes intolerable flicker or color cast, which affects the picture quality of the display panel. How to improve the flicker or color cast caused by the leakage phenomenon of the pixel circuit is one of the many technical issues in the technical field.

SUMMARY

The disclosure provides a display driving device and a display control device and an operation method thereof. The display control device is configured to control a driving operation of a source driver to drive a display panel, so as to improve the flicker or color cast caused by the leakage phenomenon of a pixel circuit.

In an embodiment of the disclosure, the above-mentioned display control device includes a data analyzing circuit and a data compensation circuit. The data analyzing circuit is configured to perform arithmetic operation on multiple sub-pixel data output by a target driving channel of a source driver in a current frame to obtain a resultant value corresponding to the target driving channel. The data compensation circuit is coupled to the data analyzing circuit to receive the resultant value. The data compensation circuit is configured to determine at least one compensation grayscale value corresponding to the resultant value, the compensation grayscale value is to be displayed by the target driving channel in a vertical blank period of a frame period, and the current frame is displayed in the frame period. The target driving channel of the source driver outputs at least one compensation voltage corresponding to the at least one compensation grayscale value in the vertical blank period of the frame period.

In an embodiment of the disclosure, the above-mentioned operation method includes: arithmetic operation is performed on multiple sub-pixel data output by a target driving channel of a source driver in a current frame by a data analysis circuit of the display control device to obtain a resultant value corresponding to the target driving channel; and at least one compensation grayscale value corresponding to the resultant value is determined by a data compensation circuit of the display control device. The compensation grayscale value is to be displayed by the target driving channel in a vertical blank period of a frame period in which the current frame is displayed. The target driving channel of the source driver outputs at least one compensation voltage corresponding to the at least one compensation grayscale value in the vertical blank period of the frame period.

In an embodiment of the disclosure, the above-mentioned display driving device includes a source driver and a display control device. The display control device is coupled to the source driver for controlling a driving operation of the source driver. The display control device performs arithmetic operation on multiple sub-pixel data output by a target driving channel of the source driver in a current frame to obtain a resultant value corresponding to the target driving channel. The display control device determines at least one compensation grayscale value corresponding to the resultant value. The compensation grayscale value is to be displayed by the target driving channel in a vertical blank period of a frame period in which the current frame is displayed. The target driving channel of the source driver outputs at least one compensation voltage corresponding to the at least one compensation grayscale value in the vertical blank period of the frame period.

Based on the above, the display control device according to the embodiments of the disclosure may perform arithmetic operation on multiple sub-pixel data output by a certain target driving channel in the current frame to determine the compensation grayscale value corresponding to the target driving channel. During a vertical blank period of a frame period in which the current frame is displayed, the target driving channel may output the compensation voltage corresponding to the compensation grayscale value to the display panel, so as to reduce the leakage power of the sub-pixel circuit of the display panel as much as possible. Therefore, the display control device may improve the flicker or color cast caused by the leakage phenomenon of the sub-pixel circuit.

In order to make the aforementioned features and advantages of the disclosure comprehensible, embodiments accompanied with drawings are described in detail as follows.

DESCRIPTION OF THE EMBODIMENTS

Figure 1:
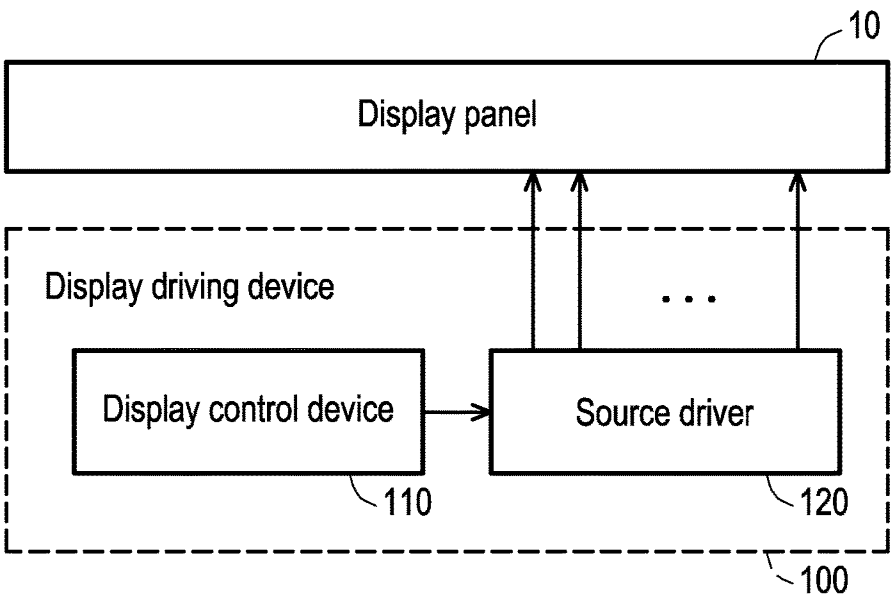
FIG. 1 is a schematic diagram of a circuit block of a display device according to an embodiment of the disclosure.

The term "coupled (or connected)" used in the specification (including the claims) may refer to any direct or indirect means of connection. For example, if that a first device is coupled (or connected) to a second device is described in the specification, the description should be construed that the first device may be directly connected to the second device, or the first device may be indirectly connected to the second device through other devices or some kind of connection means. The terms "first," "second" and the like mentioned in the specification (including the claims) are used to name the elements or to distinguish different embodiments or scopes and are not intended to limit the upper or lower limit of the number of the elements, nor are the terms intended to limit the order of the elements. In addition, wherever possible, elements/components/steps with the same reference numerals in the drawings and embodiments represent the same or similar parts. Elements/components/steps with the same reference numerals or with the same terminology in different embodiments may refer to relative descriptions of each other.

FIG. 1 is a schematic diagram of a circuit block of a display device according to an embodiment of the disclosure. The display device shown in FIG. 1 includes a display panel 10 and a display driving device 100. The embodiment does not limit the implementation details of the display panel 10. According to the actual design, in some embodiments, the display panel 10 may include a liquid crystal display (LCD) panel or other display panels. The display driving device 100 is coupled to the display panel 10. The display driving device 100 may drive the display panel 10 to display images.

In the embodiment shown in FIG. 1, the display driving device 100 may include a display control device 110 and a source driver 120. The display control device 110 is coupled to the source driver 120. The display control device 110 may control the source driver 120 to drive the display panel 10. The embodiment does not limit the implementation details of the operation of the display panel 10 driven by the source driver 120. According to the actual design, in some embodiments, the source driver 120 may include a general source driver or other source drivers. In accordance with the scan timing of the display panel 10, the source driver 120 may drive the display panel 10 to display images.

In general, the source driver 120 has multiple driving channels. Each of the driving channels is coupled to at least one corresponding data line of the display panel 10. For the convenience of description, one of the driving channels of the source driver 120 (hereinafter referred to as the target driving channel) is used as an example for description below. For the other driving channels of the source driver 120, a reference may be made to the relevant description of the target driving channel and inferences may be drawn accordingly, and thus the description is not repeated here.

The display control device 110 may perform arithmetic operation on multiple sub-pixel data output by a certain target driving channel of the source driver 120 in a current frame to obtain a resultant value corresponding to the target driving channel. For example, it is assumed that the corresponding sub-pixel data output by the target driving channel in the current frame has 2160 sub-pixel data, based on the display panel having 4K resolution (3840*2160 pixels). In some embodiments, the display control device 110 may perform one of an average operation, a median operation, and a root mean square operation on the 2160 sub-pixel data output by the target driving channel in the current frame as the arithmetic operation to obtain an average value, a median, or a root mean square value as the resultant value. Alternatively, the display control device 110 may select the maximum value (or the minimum value) as the resultant value from the 2160 sub-pixel data output by the target driving channel in the current frame.

The display control device 110 may determine at least one compensation grayscale value corresponding to the resultant value. The display control device 110 may output the at least one compensation grayscale value to the source driver 120 during a vertical blank period of a frame period in which the current frame is displayed. The at least one compensation grayscale value is to be displayed by the target driving channel in the vertical blank period during the frame period. The target driving channel of the source driver 120 may output at least one compensation voltage corresponding to the at least one compensation grayscale value to the display panel 10 during the vertical blank period.

According to different design requirements, the implementation manner of the above-mentioned display control device 110 may be hardware, firmware, software, or a combination of more than one of the aforementioned three implementations. In terms of hardware, the display control device 110 may be implemented as a logic circuit on an integrated circuit. The relevant functions of the display control device 110 may be implemented as hardware using hardware description languages (e.g., Verilog HDL or VHDL) or other suitable programming languages. For example, the relevant functions of the display control device 110 may be implemented in one or more controllers, microcontrollers, microprocessors, application-specific integrated circuits (ASICs), digital signal processors (DSPs), field programmable gate arrays (FPGAs), and/or various logic blocks, modules, and circuits in other processing units.

In terms of software and/or firmware, the relevant functions of the display control device 110 may be implemented as programming codes. For example, the display control device 110 is implemented using general programming languages (e.g., C, C++, or assembly languages) or other suitable programming languages. The programming code may be recorded/stored in a "non-transitory readable medium". In some embodiments, the non-transitory readable medium includes, for example, a semiconductor memory, a programmable logic circuit, and/or a storage device. A central processing unit (CPU), a controller, a microcontroller, or a microprocessor may read and execute the programming code from the non-transitory readable medium, so as to implement the relevant functions of the display control device 110.

Figure 2:
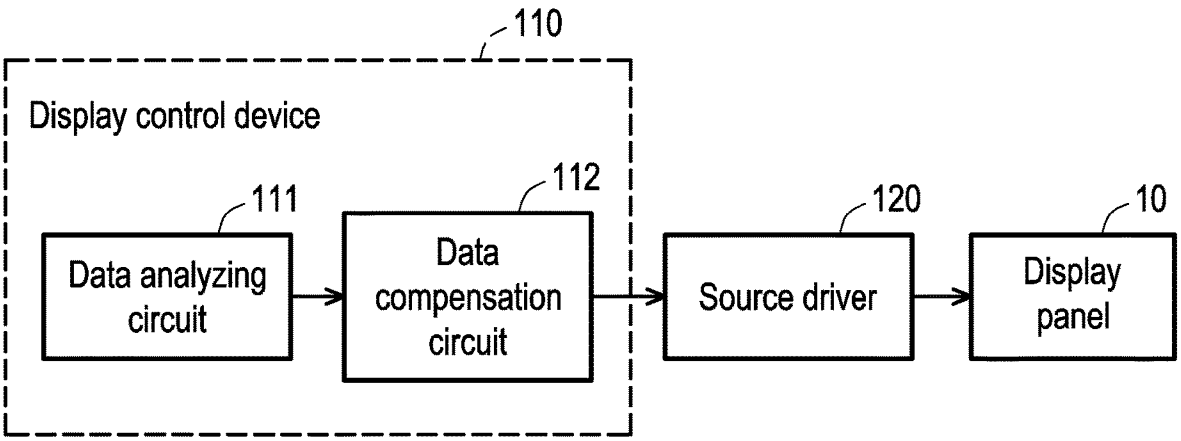
FIG. 2 is a schematic diagram of a circuit block of a display control device according to an embodiment of the disclosure.

FIG. 2 is a schematic diagram of a circuit block of a display control device 110 according to an embodiment of the disclosure. The display control device 110 is configured to control the driving operation of the source driver 120. The display panel 10, the display control device 110, and the source driver 120 shown in FIG. 2 may refer to the related descriptions of the display panel 10, the display control device 110, and the source driver 120 shown in FIG. 1, and thus the descriptions are not repeated here. In the embodiment shown in FIG. 2, the display control device 110 includes a data analyzing circuit 111 and a data compensation circuit 112.

Figure 3:
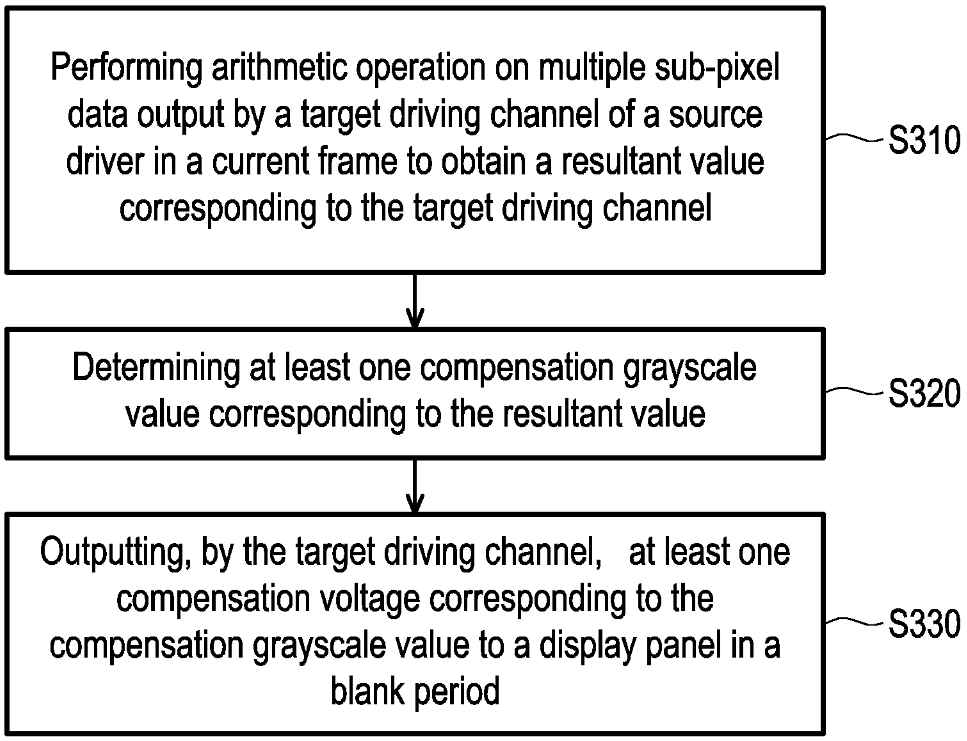
FIG. 3 is a schematic flowchart of an operation method of a display control device according to an embodiment of the disclosure.

FIG. 3 is a schematic flowchart of an operation method of a display control device according to an embodiment of the disclosure. Please refer to FIG. 2 and FIG. 3. In step S310, the data analyzing circuit 111 may perform arithmetic operation on multiple sub-pixel data output by a target driving channel of the source driver 120 in a current frame to obtain a resultant value corresponding to the target driving channel. For example, it is assumed that there are 2160 sub-pixel data output by the target driving channel in the current frame. In some embodiments, the data analyzing circuit 111 may perform one of an average operation, a median operation, and a root mean square operation on the 2160 sub-pixel data output by the target driving channel in the current frame as the arithmetic operation to obtain an average value, a median, or a root mean square value as the resultant value. Alternatively, the data analyzing circuit 111 may select the maximum value (or the minimum value) as the resultant value from the 2160 sub-pixel data output by the target driving channel in the current frame.

The data compensation circuit 112 is coupled to the data analyzing circuit 111 to receive the resultant value. In step S320, the data compensation circuit 112 may determine at least one compensation grayscale value corresponding to the resultant value. The at least one compensation grayscale value is to be displayed by the target driving channel of the source driver 120 in a vertical blank period of a frame period in which the current frame is displayed. In step S330, the target driving channel of the source driver 120 outputs at least one compensation voltage corresponding to the at least one compensation grayscale value to the display panel 10 in the vertical blank period of the frame period.

Based on the above, the display control device 110 shown in FIG. 2 may perform the arithmetic operation on a certain target driving channel of the source driver 120 to determine the at least one compensation grayscale value corresponding to the target driving channel. In a vertical blank period of a frame period in which the current frame is displayed, the target driving channel of the source driver 120 may output the at least one compensation voltage corresponding to the compensation grayscale value to the display panel 10 to reduce the leakage power of the sub-pixel circuit of the display panel 10 as much as possible. Therefore, the display control device 110 may improve the flicker or color cast caused by the leakage phenomenon of the sub-pixel circuit of the display panel 10.

Figure 4:
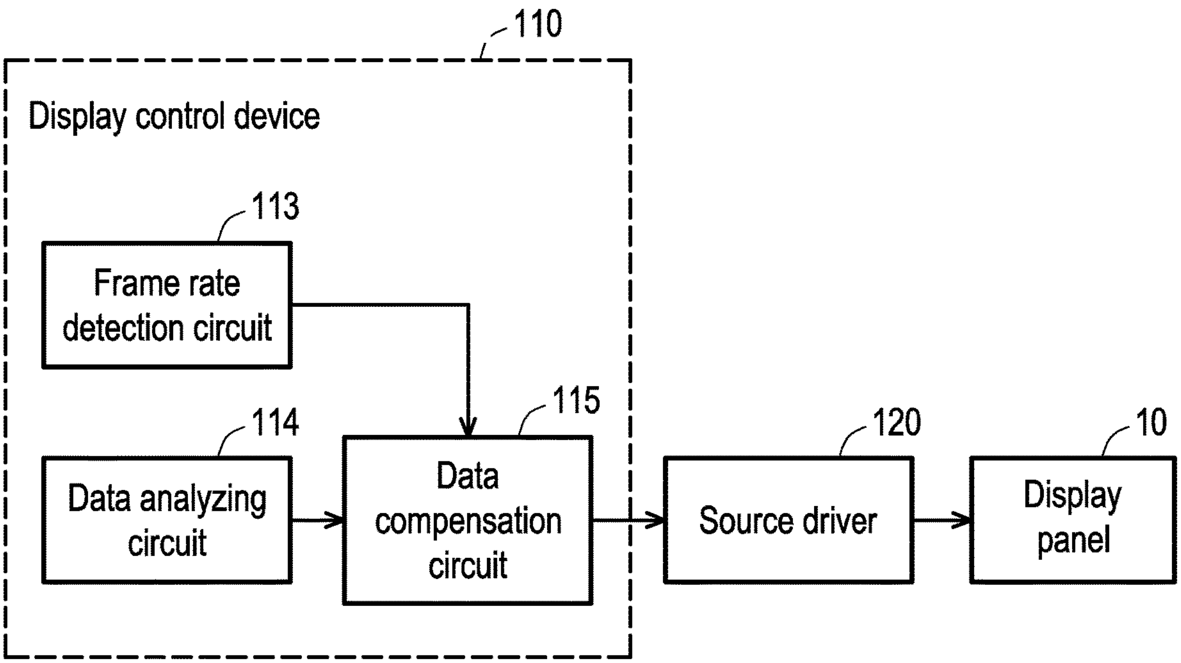
FIG. 4 is a schematic diagram of a circuit block of a display control device according to another embodiment of the disclosure.

FIG. 4 is a schematic diagram of a circuit block of a display control device 110 according to another embodiment of the disclosure. The display control device 110 is configured to control the driving operation of the source driver 120. The display panel 10, the display control device 110, and the source driver 120 shown in FIG. 4 may refer to the related descriptions of the display panel 10, the display control device 110, and the source driver 120 shown in FIG. 1, and thus the descriptions are not repeated here. In the embodiment shown in FIG. 4, the display control device 110 includes a frame rate detection circuit 113, a data analyzing circuit 114, and a data compensation circuit 115. The data analyzing circuit 114 and the data compensation circuit 115 shown in FIG. 4 may refer to the related descriptions of the data analyzing circuit 111 and the data compensation circuit 112 shown in FIG. 2 and make inferences accordingly. Alternatively, the data analyzing circuit 111 and/or the data compensation circuit 112 shown in FIG. 2 may refer to the relevant descriptions of the data analyzing circuit 114 and/or the data compensation circuit 115 shown in FIG. 4 and make inferences accordingly.

In the embodiment shown in FIG. 4, the frame rate detection circuit 113 is coupled to the data compensation circuit 115. The frame rate detection circuit 113 may detect the frame rate. In other words, the frame rate detection circuit 113 may detect the time length of a vertical blank period of a frame period in which the current frame is displayed. The detection details of the frame rate detection circuit 113 are not limited here. According to the actual design, in some embodiments, the frame rate detection circuit 113 may detect the period of a vertical synchronization signal to obtain the frame rate. In other embodiments, the frame rate detection circuit 113 may detect a vertical blank period start time and a vertical blank period end time to know the time length of the current vertical blank period, thereby obtaining the frame rate based on information of the time length of an active data period (or called a display period) and the time length of the current vertical blank period.

The frame rate detection circuit 113 may provide the detection result, i.e., the frame rate, to the data compensation circuit 115. The data compensation circuit 115 may determine the at least one compensation grayscale value as a single compensation grayscale value or multiple compensation grayscale values according to the frame rate (as the detection result of the frame rate detection circuit 113). When the data compensation circuit 115 outputs the single compensation grayscale value to the source driver 120, the target driving channel of the source driver 120 outputs a grayscale voltage corresponding to the single compensation grayscale value to the display panel 10 during the blank period of the frame period. Alternatively, when the data compensation circuit 115 outputs the compensation grayscale values to the source driver 120, the target driving channel of the source driver 120 outputs multiple compensation grayscale voltages corresponding to the compensation grayscale values to the display panel 10 at different time points in the vertical blank period of the frame period, which may be defined by different numbers of line periods passing from the end of the active data period (or the vertical blank period start time).

Figure 5:
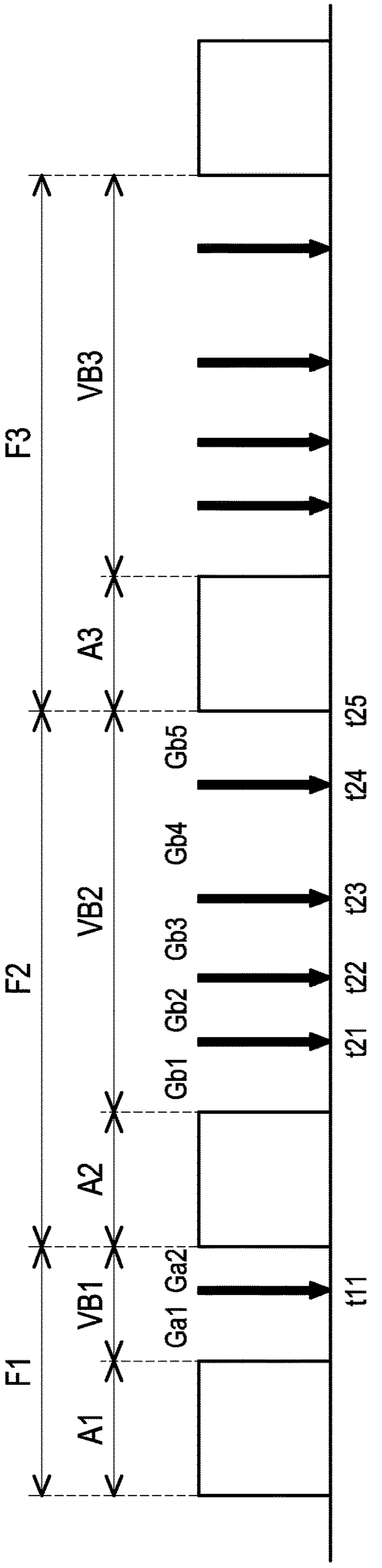
FIG. 5 is a timing diagram illustrating that the data compensation circuit changes the compensation grayscale value in the vertical blank period according to the change of the frame rate according to an embodiment of the disclosure.

FIG. 5 is a timing diagram illustrating that the data compensation circuit 115 changes the compensation grayscale value in the vertical blank period according to the change of the frame rate according to an embodiment of the disclosure. The horizontal axis of FIG. 5 represents time. FIG. 5 shows three frame periods F1, F2, and F3. The frame period F1 includes an active data period (or a display period) A1 and a vertical blank period VB1, the frame period F2 includes an active data period A2 and a vertical blank period VB2, and the frame period F3 includes an active data period A3 and a vertical blank period VB3. In the embodiment shown in FIG. 5, the display panel 10 operates in a variable refresh rate (VRR) mode, so the time lengths of different frame periods may be different from each other, that is, the time lengths of the vertical blank periods of different frame periods may be different from each other.

Please refer to FIG. 4 and FIG. 5. Assuming that the frame period F1 is the current frame, the data analyzing circuit 114 may perform arithmetic operation on multiple sub-pixel data output by a target driving channel of the source driver 120 in the active data period A1 of the frame period F1 to obtain a resultant value corresponding to the target driving channel in the active data period A1. Based on the resultant value corresponding to the active data period A1, the data compensation circuit 115 may determine a compensation grayscale value Ga1 corresponding to the resultant value of the active data period A1, and provide the compensation grayscale value Ga1 to the source driver 120. After the active data period A1 ends, based on the compensation grayscale value Ga1 provided by the data compensation circuit 115, the target driving channel of the source driver 120 may output a compensation voltage corresponding to the compensation grayscale value Ga1 to the display panel 10 during the vertical blank period (the vertical blank period VB1) of the frame period F1. The frame rate detection circuit 113 may provide a position of a preconfigured time point in the vertical blank period VB1 to the data compensation circuit 115. When the time reaches a time point t11 in the vertical blank period VB1, the data compensation circuit 115 may generate a compensation grayscale value Ga2 and provide the compensation grayscale value Ga2 to the source driver 120, so that the target driving channel of the source driver 120 may output a compensation voltage corresponding to the compensation grayscale value Ga2 to the display panel 10 after the time point t11 until the vertical blank period VB1 ends.

Similarly, assuming that the frame period F2 is the current frame, the data analyzing circuit 114 may perform arithmetic operation on multiple sub-pixel data output by a target driving channel of the source driver 120 in the active data period A2 of the frame period F2 to obtain a resultant value corresponding to the target driving channel in the active data period A2. Based on the resultant value corresponding to the active data period A2, the data compensation circuit 115 may determine a compensation grayscale value Gb1 corresponding to the resultant value of the active data period A2, and provide the compensation grayscale value Gb1 to the source driver 120. After the active data period A2 ends, based on the compensation grayscale value Gb1 provided by the data compensation circuit 115, the target driving channel of the source driver 120 may output a compensation voltage corresponding to the compensation grayscale value Gb1 to the display panel 10 during the vertical blank period VB2 of the frame period F2.

The frame rate detection circuit 113 may provide positions of multiple reconfigured time points such as t21-t24 in the vertical blank period VB2 to the data compensation circuit 115. When the time reaches a time point t21 in the vertical blank period VB2, the data compensation circuit 115 may generate a compensation grayscale value Gb2 and provide the compensation grayscale value Gb2 to the source driver 120, so that the target driving channel of the source driver 120 may output a compensation voltage corresponding to the compensation grayscale value Gb2 to the display panel 10 after the time point t21. When the time reaches a time point t22 in the vertical blank period VB2, the data compensation circuit 115 may generate a compensation grayscale value Gb3 and provide the compensation grayscale value Gb3 to the source driver 120, so that the target driving channel of the source driver 120 may output a compensation voltage corresponding to the compensation grayscale value Gb3 to the display panel 10 after the time point t22. When the time reaches a time point t23 in the vertical blank period VB2, the data compensation circuit 115 may generate a compensation grayscale value Gb4 and provide the compensation grayscale value Gb4 to the source driver 120 when the time reaches a time point t23 in the vertical blank period VB2, so that the target driving channel of the source driver 120 may output a compensation voltage corresponding to the compensation grayscale value Gb4 to the display panel 10 after the time point t23. When the time reaches a time point t24 in the vertical blank period VB2, the data compensation circuit 115 may generate a compensation grayscale value Gb5 and provide the compensation grayscale value Gb5 to the source driver 120, so that the target driving channel of the source driver 120 may output a compensation voltage corresponding to the compensation grayscale value Gb5 to the display panel 10 after the time point t24 until the vertical blank period VB2 ends. The longer the vertical blank period in a frame period is, the more compensation steps realized by more compensation grayscale values the display control device may provide.

The embodiment does not limit the manner in which the data compensation circuit 115 generates the compensation grayscale value. For example, in some embodiments, the data compensation circuit 115 may multiply the compensation grayscale value Gb1 by a certain coefficient g to generate the compensation grayscale value Gb2, that is, Gb2=Gb1*g. The coefficient g may be a real number determined according to the actual design. By inference, the compensation grayscale value Gb3 may be the product of the compensation grayscale value Gb2 multiplied by the coefficient g, the compensation grayscale value Gb4 may be the product of the compensation grayscale value Gb3 multiplied by the coefficient g, and the compensation grayscale value Gb5 may be the product of the compensation grayscale value Gb4 multiplied by the coefficient g. In another embodiments, each of the compensation grayscale values Gb2-Gb4 may be the product of the compensation grayscale value Gb1 and a respective coefficient.

In other embodiments, the data compensation circuit 115 may subtract (or add) a certain real number d from (or to) the compensation grayscale value Gb1 to generate the compensation grayscale value Gb2. The real number d may be determined according to the actual design. By inference, the compensation grayscale value Gb3 may be the difference between the compensation grayscale value Gb2 minus the real number d (or the sum of the compensation grayscale value Gb2 plus the real number d), and the compensation grayscale value Gb4 may be the difference between the compensation grayscale value Gb3 minus the real number d (or the sum of the compensation grayscale value Gb3 plus the real number d), and the compensation grayscale value Gb5 may be the difference between the compensation grayscale value Gb4 minus the real number d (or the sum of the compensation grayscale value Gb4 plus the real number d).

In still other embodiments, the data compensation circuit 115 may look up the corresponding difference values from a lookup table according to the position of the preconfigured time points in the vertical blank period. For example, the contents of the lookup table may include different difference values for different time points. These difference values of the lookup table may be multiple real numbers determined according to the actual design. Taking the vertical blank period VB2 as an example, when the current point falls between the time point t21 and the time point t22, the data compensation circuit 115 may obtain a difference value D1 from the lookup table. The data compensation circuit 115 may subtract (or add) the difference value D1 from (or to) the compensation grayscale value Gb1 to generate the compensation grayscale value Gb2. When the current point falls between the time point t22 and the time point t23, the data compensation circuit 115 may obtain a difference value D2 from the lookup table. The compensation grayscale value Gb3 may be the difference between the compensation grayscale value Gb1 minus the difference value D2 (or the sum of the compensation grayscale value Gb1 plus the difference value D2). When the current point falls between the time point t23 and the time point t24, the data compensation circuit 115 may obtain a difference value D3 from the lookup table. The compensation grayscale value Gb4 may be the difference between the compensation grayscale value Gb1 minus the difference value D3 (or the sum of the compensation grayscale value Gb1 plus the difference value D3). When the current point falls between the time point t24 and the time point t25, the data compensation circuit 115 may obtain a difference value D4 from the lookup table. The compensation grayscale value Gb5 may be the difference between the compensation grayscale value Gb1 minus the difference value D4 (or the sum of the compensation grayscale value Gb1 plus the difference value D4).

In some further embodiments, different periods in the vertical blank period may have the same compensation grayscale value. Taking the vertical blank period VB2 as an example, the compensation grayscale values Gb1, Gb2, Gb3, Gb4, and Gb5 may be the same as each other.

In summary, the display control device 110 according to the above-mentioned embodiments may perform arithmetic operation on multiple sub-pixel data output by a certain target driving channel of the source driver 120 in the current frame, so as to determine one (or more) compensation grayscale values corresponding to the target driving channel. During the vertical period of the current frame, the target driving channel of the source driver 120 may output one (or more) compensation voltages corresponding to the compensation grayscale values to the display panel 10, so as to reduce the leakage power of the sub-pixel circuit of the display panel 10 as much as possible. Therefore, the display control device 110 may improve the flicker or color cast caused by the leakage phenomenon of the sub-pixel circuit of the display panel 10.

Although the disclosure has been described with reference to the above embodiments, the described embodiments are not intended to limit the disclosure. People of ordinary skill in the art may make some changes and modifications without departing from the spirit and the scope of the disclosure. Thus, the scope of the disclosure shall be subject to those defined by the attached claims.

What is claimed is:

1. A display control device for controlling a driving operation of a source driver to drive a display panel, comprising:

a data analyzing circuit, configured to perform arithmetic operation on a plurality of sub-pixel data outputted by a target driving channel of the source driver in an active data period of a current frame period to obtain a resultant value corresponding to the target driving channel;

a data compensation circuit, coupled to the data analyzing circuit for receiving the resultant value, and configured to determine at least one compensation grayscale value corresponding to the resultant value, wherein the at least one compensation grayscale value is to be displayed by the target driving channel in a vertical blank period of a frame period in which the current frame is displayed, and the target driving channel of the source driver outputs at least one compensation voltage corresponding to the at least one compensation grayscale value in the vertical blank period of the frame period; and a frame rate detection circuit, coupled to the data compensation circuit, configured to detect a frame rate, wherein the data compensation circuit determines the at least one compensation grayscale value as a single compensation grayscale value or a plurality of compensation grayscale values according to the frame rate.

2. The display control device of claim 1, wherein the data analyzing circuit performs one of an average operation, a median operation and a root mean square operation as the arithmetic operation on the sub-pixel data output by the target driving channel in the current frame to obtain an average value, a median, or a root mean square value as the resultant value, or the data analyzing circuit selects a maximum value or a minimum value as the resultant value from the sub-pixel data output by the target driving channel in the current frame.

3. The display control device of claim 1, when the data compensation circuit outputs the single compensation grayscale value to the source driver during the vertical blank period of the frame period, the target driving channel of the source driver outputs a grayscale voltage corresponding to the single compensation grayscale value during the vertical blank period of the frame period; and when the data compensation circuit outputs the plurality of compensation grayscale values to the source driver during the vertical blank period of the frame period, the target driving channel of the source driver outputs a plurality of compensation grayscale voltages corresponding to the plurality of compensation grayscale values at different time points in the vertical blank period of the frame period.

4. The display control device of claim 1, wherein the frame rate detection circuit detects a period of a vertical synchronization signal to obtain the frame rate.

5. The display control device of claim 1, wherein the frame rate detection circuit detects a vertical blank period start time and a vertical blank period end time to know the frame rate.

6. An operation method of a display control device, comprising:

performing arithmetic operation, by a data analyzing circuit of the display control device, on a plurality of sub-pixel data output by a target driving channel of a source driver in an active data period of a current frame period to obtain a resultant value corresponding to the target driving channel;

determining, by a data compensation circuit of the display control device, at least one compensation grayscale value corresponding to the resultant value;

detecting a frame rate by a frame rate detection circuit of the display control device; and determining the at least one compensation grayscale value as a single compensation grayscale value or a plurality of compensation grayscale values according to the frame rate, wherein the at least one compensation grayscale value is to be displayed by the target driving channel in a vertical blank period of a frame period in which the current frame is displayed, and wherein the target driving channel of the source driver outputs at least one compensation voltage corresponding to the at least one compensation grayscale value in the vertical blank period of the frame period.

7. The operation method of claim 6, further comprising:

performing one of an average operation, a median operation and a root mean square operation as the arithmetic operation on the sub-pixel data output by the target driving channel in the current frame to obtain an average value, a median, or a root mean square value as the resultant value, or selecting a maximum value or a minimum value as the resultant value from the sub-pixel data output by the target driving channel in the current frame.

8. The operation method of claim 6, wherein when the single compensation grayscale value is output to the source driver during the vertical blank period of the frame period, the target driving channel outputs a grayscale voltage corresponding to the single compensation grayscale value during the vertical blank period of the frame period; and when the plurality of compensation grayscale values is output to the source driver during the vertical blank period of the frame period, the target driving channel outputs a plurality of compensation grayscale voltages corresponding to the plurality of compensation grayscale values at different time points in the vertical blank period of the frame period.

9. The operation method of claim 6, further comprising: detecting a period of a vertical synchronization signal to obtain the frame rate.

10. The operation method of claim 6, further comprising: detecting a vertical blank period start time and a vertical blank period end time to know the frame rate.

11. A display driving device, comprising:

a source driver; and a display control device, coupled to the source driver, configured to control a driving operation of the source driver to drive a display panel, wherein the display control device performs arithmetic operation on a plurality of sub-pixel data output by a target driving channel of the source driver in an active data period of a current frame period to obtain a resultant value corresponding to the target driving channel, the display control device determines at least one compensation grayscale value corresponding to the resultant value, the display control device detects a frame rate and determines the at least one compensation grayscale value as a single compensation grayscale value or a plurality of compensation grayscale values according to the frame rate, the at least one compensation grayscale value is to be displayed by the target driving channel in a vertical blank period of a frame period in which the current frame is displayed, and the target driving channel of the source driver outputs at least one compensation voltage corresponding to the at least one compensation grayscale value in the vertical blank period of the frame period.

12. The display driving device of claim 11, wherein the display control device comprises:

a data analyzing circuit, configured to perform the arithmetic operation on the plurality of sub-pixel data output by the target driving channel of the source driver in the current frame to obtain the resultant value; and a data compensation circuit, coupled to the data analyzing circuit for receiving the resultant value, and configured to determine the at least one compensation grayscale value corresponding to the resultant value.

13. The display driving device of claim 12, wherein the data analyzing circuit performs one of an average operation, a median operation and a root mean square operation as the arithmetic operation on the sub-pixel data output by the target driving channel in the current frame to obtain an average value, a median, or a root mean square value as the resultant value, or the data analyzing circuit selects a maximum value or a minimum value as the resultant value from the sub-pixel data output by the target driving channel in the current frame.

14. The display driving device of claim 12, wherein the display control device further comprises:

a frame rate detection circuit, coupled to the data compensation circuit, configured to detect the frame rate;

wherein the data compensation circuit determines the at least one compensation grayscale value as the single compensation grayscale value or the plurality of compensation grayscale values according to the frame rate;

when the data compensation circuit outputs the single compensation grayscale value to the source driver during the vertical blank period of the frame period, the target driving channel of the source driver outputs a grayscale voltage corresponding to the single compensation grayscale value during the vertical blank period of the frame period; and when the data compensation circuit outputs the plurality of compensation grayscale values to the source driver during the vertical blank period of the frame period, the target driving channel of the source driver outputs a plurality of compensation grayscale voltages corresponding to the plurality of compensation grayscale values at different line periods in the vertical blank period of the frame period.

15. The display driving device of claim 14, wherein the frame rate detection circuit, detects a current period of a vertical synchronization signal to obtain the frame rate.

16. The display driving device of claim 14, wherein the frame rate detection circuit detects a vertical blank period start time and a vertical blank period end time to know the frame rate.

* * * * *